United States Patent [19]
Gephardt et al.

[11] Patent Number: 5,561,819
[45] Date of Patent: Oct. 1, 1996

[54] COMPUTER SYSTEM SELECTING BYTE LANE FOR A PERIPHERAL DEVICE DURING I/O ADDRESSING TECHNIQUE OF DISABLING NON-PARTICIPATING PERIPHERALS BY DRIVING AN ADDRESS WITHIN A RANGE ON THE LOCAL BUS IN A DMA CONTROLLER

[75] Inventors: Douglas D. Gephardt; Dan S. Mudgett, both of Austin; James R. MacDonald, Buda, all of Tex.

[73] Assignee: Advanced Micro Devices, Sunnyvale, Calif.

[21] Appl. No.: 145,376

[22] Filed: Oct. 29, 1993

[51] Int. Cl.⁶ .................................................. G06F 13/28
[52] U.S. Cl. ..................... 395/847; 395/842; 395/846; 395/500; 364/242.3; 364/242.34; 364/948.1
[58] Field of Search ..................................... 395/425, 650, 395/842, 600, 846; 364/238.2, 240.7, 242.31, 260, 200, 258.2, 242.3, 242.34, 948.1

[56] References Cited

U.S. PATENT DOCUMENTS

| | | | |
|---|---|---|---|
| 4,271,466 | 6/1981 | Yamamoto et al. | 364/200 |
| 4,475,155 | 10/1984 | Oishi et al. | 364/200 |
| 4,514,808 | 4/1985 | Murayama | 364/200 |
| 4,807,112 | 2/1989 | Hamasaki | 364/200 |
| 4,815,034 | 3/1989 | Mackey | 364/900 |
| 5,187,783 | 2/1993 | Mansfield et al. | 395/425 |
| 5,297,242 | 3/1995 | Miki | 395/425 |
| 5,404,481 | 4/1995 | Miyamori | 395/425 |

FOREIGN PATENT DOCUMENTS 0206083  12/1986  European Pat. Off. .
WO90/10907  9/1990  WIPO .

OTHER PUBLICATIONS

"Emulation of IBM PC Bus Operations by an 80188 Processor," *IBM Technical Disclosure Bulletin*, Mar. 1989, IBM Corp, pp. 126–129.

Zilog, "1983/84 Components Data Book", Z8410, Z80 DMA Direct Memory Access Controller (pp. 27–44).

*Primary Examiner*—Thomas C. Lee
*Assistant Examiner*—Terance J. Stanton
*Attorney, Agent, or Firm*—B. Noel Kivlin

[57] ABSTRACT

A direct memory access controller implements a two-cycle approach for performing a desired DMA transfer by executing both a memory access cycle and an I/O access cycle. During the memory access cycle, the address location of system memory to be accessed is driven on the addressing lines of a local bus. During the I/O access cycle, an address value within a DMA configuration address range is driven on the address lines of the local bus. The lower two order bits of the address value are encoded to provide byte lane information to a peripheral device during the I\O access cycle. The peripheral device responsively receives or provides data at the specified byte lane. As a result, peripheral devices that may be connected to the local bus will not respond to the I/O access cycle, while encoded byte lane information is provided to the desired peripheral device without requiring dedicated byte select lines.

16 Claims, 7 Drawing Sheets

COMPUTER SYSTEM SELECTING BYTE LANE FOR A PERIPHERAL DEVICE DURING I/O ADDRESSING TECHNIQUE OF DISABLING NON-PARTICIPATING PERIPHERALS BY DRIVING AN ADDRESS WITHIN A RANGE ON THE LOCAL BUS IN A DMA CONTROLLER

BACKGROUND OF THE INVENTION

1. Field of the Invention

This invention relates to computer systems and more particularly to byte lane select techniques employed during direct memory access operations of a DMA controller.

2. Description of the Relevant Art

In early personal computer system designs, the transfer of information between system memory and I/O addressable peripheral devices such as disk controllers, displays, keyboards and serial/parallel interface units was performed directly by the system microprocessor. As the number of transactions with peripheral devices increased and the capabilities of such devices expanded, the burden on the microprocessor associated with this transfer task severely limited overall system performance. Accordingly, techniques were developed to free the microprocessor from this task. Direct memory access (DMA) was one such developed technique.

Direct memory access is typically handled by a DMA controller which is assigned the task of coordinating and performing data transfers between system memory and a peripheral device (or other system resource) without the intervention of the microprocessor. Before a DMA transfer can begin, certain information herein referred to as "initialization data" must be provided to the DMA controller from the microprocessor to indicate the direction of the transfer to be executed (i.e., memory-to-peripheral device or peripheral device-to-memory) as well as the first address of system memory from which data is to be retrieved or to which data is to be written. The number of data words or bytes involved in the desired DMA transfer operation is further specified by the initialization data.

Following initialization, the peripheral device (or peripheral controller) can initiate the DMA transfer at any time by asserting a request signal to indicate that it is ready to receive or transmit data via a direct memory access operation. The DMA controller responsively obtains mastership of the local bus by asserting a bus request signal (referred to as a "HOLD" signal for some microprocessors). When the microprocessor detects assertion of the bus request signal, it completes the operation it is currently executing, disables its address, data, and control bus outputs, and asserts a bus acknowledge signal. The DMA controller then takes control of the local bus to perform the transfer.

The DMA controller may execute a DMA transfer using one of two basic approaches: a one-cycle transfer or a two-cycle transfer. FIG. 1 illustrates a memory-to-peripheral device transfer using the two-cycle approach. Specifically, FIG. 1 is a block diagram of a computer system that includes a microprocessor (CPU) 10, a DMA controller 12, a system memory 14, a peripheral controller 16, and a peripheral device 18. A data bus 20, an address bus 22, and a control bus 24 (referred to collectively as a local bus) interconnect microprocessor 10, DMA controller 12, system memory 14, and peripheral controller 16.

The DMA controller 12 begins the transfer by reading the first memory location of system memory 14 to be transferred and storing the data byte in a temporary register located in the DMA controller 12. The DMA controller 12 performs the read in the same manner as a typical microprocessor; it places the memory address on the address bus 22, asserts a MEMRD (memory read) control signal, and reads the data from the data bus 20. When the DMA controller 12 has completed the read cycle, it drives the data in the temporary register back onto the data bus 20, addresses the peripheral controller 16, and asserts the IOWR (I/O write) control signal. One word (or byte) of data is thereby read from the system memory 14 and is written to the peripheral device 18. The memory address is then incremented, and the process is repeated to transfer the next word. When the specified number of words have been transferred (or after each word in a cycle-stealing mode), the DMA controller 12 deasserts the bus request signal and the microprocessor 10 resumes operation from the point at which it was halted.

While the two-cycle transfer described above historically provided a great degree of flexibility, the transfer rate was typically relatively slow since two bus cycles were required for each transfer. One-cycle DMA transfers were accordingly introduced to increase the speed of DMA transfers.

To implement one-cycle transfers, a DMA acknowledge signal is typically used to take the place of the address select signals for the peripheral controller and allows the DMA controller to select an I/O port while simultaneously addressing memory. FIG. 2 is a block diagram of a computer system that illustrates a memory-to-peripheral device transfer using the one-cycle approach. Circuit blocks that correspond to those of FIG. 1 are numbered identically.

To transfer data from system memory 14 to peripheral device 18, the DMA controller 12 places the memory address on the address bus 22 and asserts the DMA acknowledge signal to select the peripheral device 18. It is noted that within such systems, a unique DMA acknowledge signal is provided to each peripheral controller (or I/O port) that can be used in a DMA transfer. The DMA controller 12 then asserts both the MEMRD and IOWR control signals. The system memory 14 responsively provides the data on the data bus 20, which is read directly by the peripheral device 18. In this situation, the data does not pass through the DMA controller 12. Since only one bus cycle is required, the DMA transfer may be accomplished relatively expeditiously.

A variety of specific DMA controllers and compatible peripheral devices have therefore developed that exploit the improved speed characteristics of the one cycle DMA transfer approach. A number of these compatible peripheral devices have become industry standards for use with, for example, computer systems based on the models 80386 and 80486 microprocessors.

Although the one-cycle approach to DMA transfers accommodates relatively high speeds of operation, it is also associated with many drawbacks. One such drawback is that an address disable signal is typically required to disable the internal address decoders of peripheral devices not involved in the DMA transfer. The address disable signal is necessary since certain peripheral devices may be mapped within a range of address locations (of I/O space) that directly corresponds to the same range of address locations of the system memory. The address disable signal prevents such peripheral devices from responding to the IOWR or IORD signal that is asserted during the DMA cycle. While this address disabling technique has been quite successful in accommodating one-cycle DMA transfers, the address disable signal requires a dedicated control line on the local bus and increases the pin-count of the associated integrated circuit packages, thus increasing overall system cost.

Yet another disadvantage of the one-cycle approach is that each device involved in the DMA transfer must be designed to recognize and respond to the protocols defined by the specialized DMA transfer cycle. This often increases the complexity in the design of, for example, the system memory, the bus bridges, and the peripheral devices.

A final noted drawback of the one-cycle approach is that the peripheral I/O addresses cannot be changed by system software and, similarly, the byte lane for multi-byte data buses cannot be changed by system software or hardware. This can limit versatility or limit system performance.

It would be desirable to provide a DMA controller and system that do not require an address disable signal for disabling the address decoders of I/O peripheral devices. It would further be desirable to provide a DMA controller and system that do not involve specialized DMA protocols to which subsystems such as the system memory must respond. It would additionally be desirable to provide a peripheral device that allows the byte lane of multi-byte data buses to be specified and changed by a DMA controller through either software or hardware.

SUMMARY OF THE INVENTION

The problems outlined above are in large part solved by DMA byte lane select technique for a peripheral device according to the present invention. In one embodiment, a direct memory access controller implements a two-cycle approach for performing a desired DMA transfer by executing both a memory access cycle and an I/O access cycle. During the memory access cycle, the address location of system memory to be accessed is driven on the addressing lines of a local bus. During the I/O access cycle, an address value within a DMA configuration address range is driven on the address lines of the local bus. The DMA configuration address range is the range of address values to which the configuration registers of the DMA controller are mapped for receiving initialization data. The lower two order bits of the address value are encoded to provide byte lane information to the peripheral device during the I/O access cycle. The peripheral device responsively receives or provides data at the specified byte lane. As a result, peripheral devices that may be connected to the local bus will not respond to the I/O access cycle, while encoded byte lane information is provided to the desired peripheral device without requiring dedicated byte select lines. An address disable signal is also not required to disable the address decoders of other I/O peripheral devices not involved in the DMA transfer. Furthermore, since the memory access cycle and the I/O access cycle of the DMA transfer are identical to those executed by the system microprocessor, subsystems are not required to respond to specialized DMA protocols.

Broadly speaking, the present invention contemplates a computer system comprising a microprocessor, a system memory, and a direct memory access controller coupled to a local bus. The direct memory access controller includes a memory address register for storing a value indicative of a memory address, a mode register for storing information indicative of a direction of a DMA data transfer, and a control circuit coupled to the mode register and capable of executing a memory access cycle during which the memory address is driven on the local bus. The control circuit is further capable of executing an I/O access cycle during which an address value within a DMA configuration address range is driven on the local bus and wherein at least one lower order addressing bit of the address value is encoded with byte lane information. The computer system finally includes a peripheral device operatively coupled to the local bus, wherein the peripheral device includes a data buffer and a multiplexer capable of coupling data between a predetermined byte lane of the local bus and the data buffer according to the byte lane information.

The present invention further contemplates a method for controlling a direct memory access operation within a computer system including a system memory, a DMA controller, and a peripheral device coupled to a local bus. The method comprises the steps of storing configuration information within the DMA controller by addressing the DMA controller with an address value within a DMA configuration address range, executing a memory access cycle on the local bus to access a predetermined memory location within the system memory, and executing an I/O access cycle and driving the local bus with an address value within the DMA configuration address range wherein at least one lower order addressing bit of the address value contains encoded byte lane information. The method further comprises the step of transferring a byte of data between a predetermined byte lane of the local bus and the peripheral device according to the encoded byte lane information.

BRIEF DESCRIPTION OF THE DRAWINGS

Other objects and advantages of the invention will become apparent upon reading the following detailed description and upon reference to the accompanying drawings in which.

Figure 1:
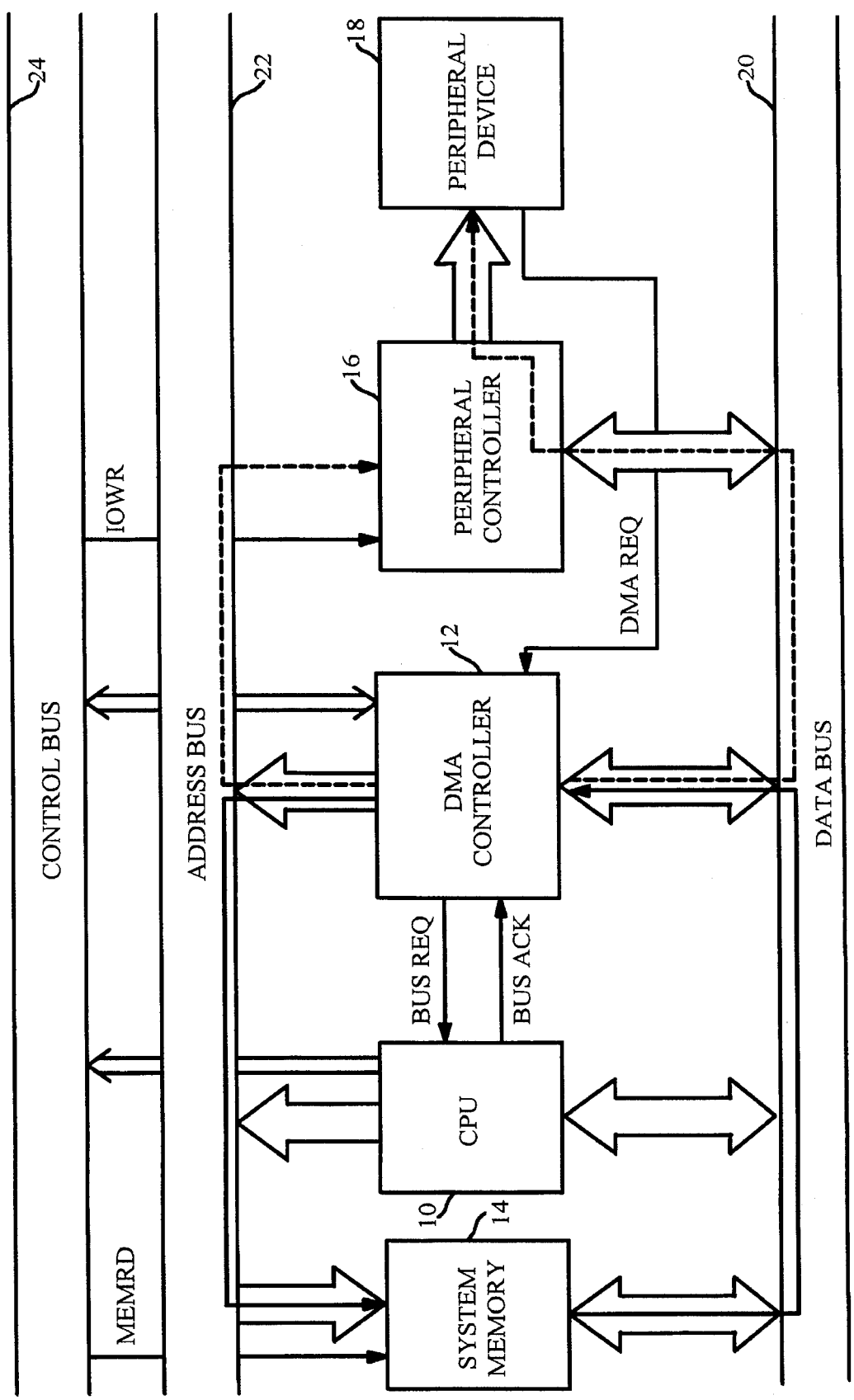
FIG. 1 is a block diagram of a prior art computer system that illustrates a two-cycle DMA transfer.
Figure 2:
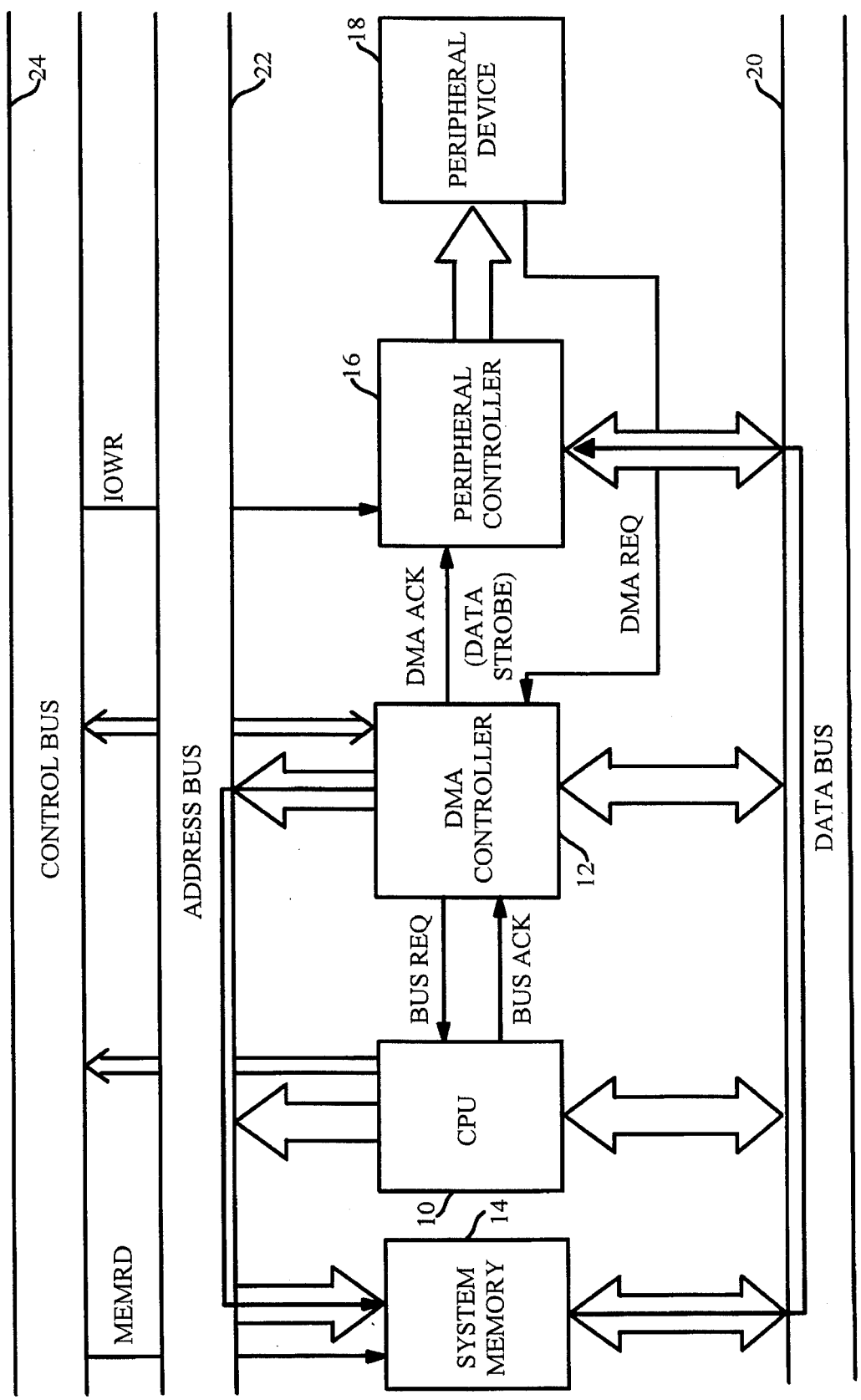
FIG. 2 is a block diagram of a prior art computer system that illustrates a one-cycle DMA transfer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
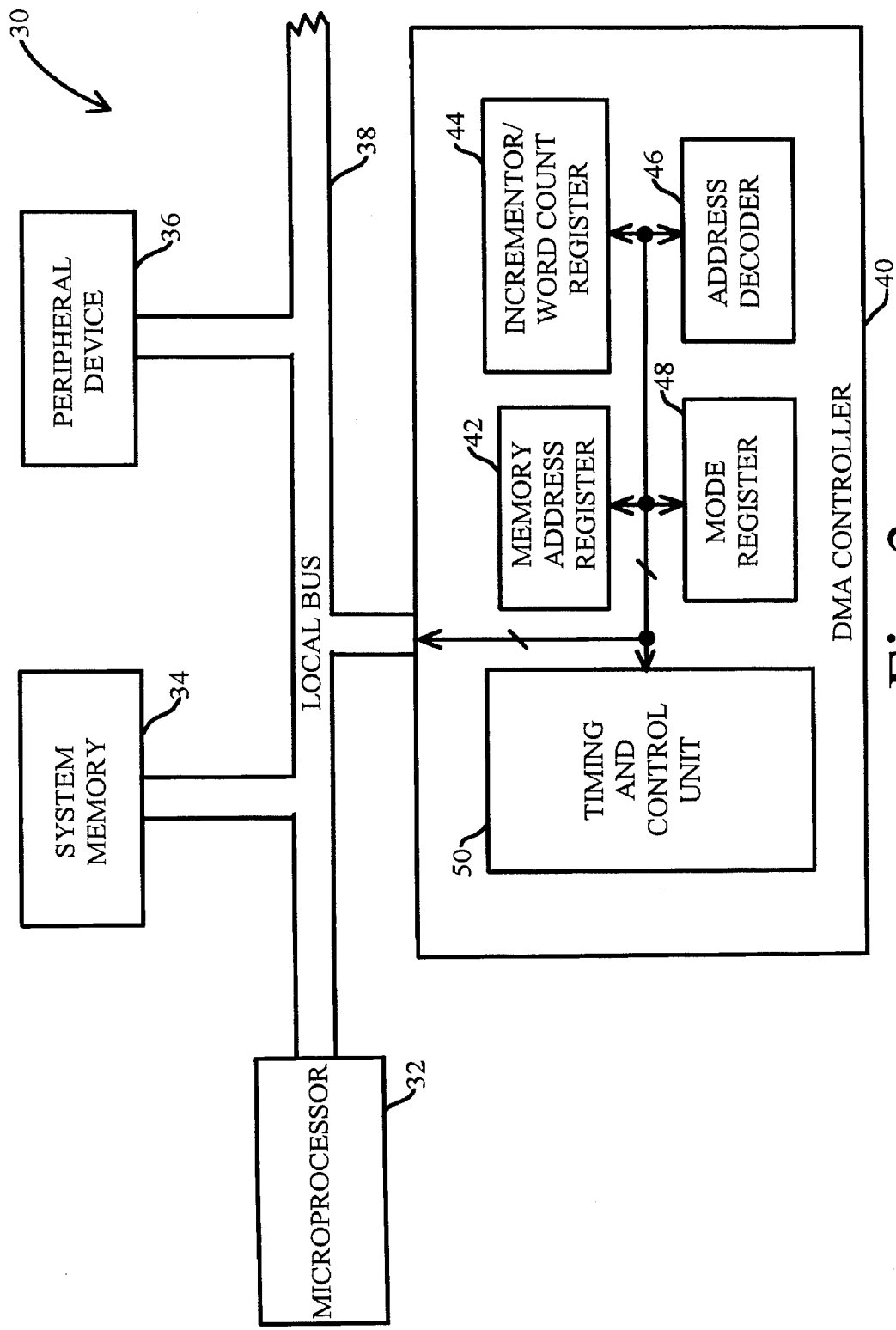
FIG. 3 is a block diagram of a prior art computer system including a DMA controller.

Turning now to FIG. 3, a block diagram of a prior art computer system 30 including a DMA controller 40 is shown. The computer system 30 also includes a microprocessor 32, a system memory 34, and a peripheral device 36. The DMA controller 40 is coupled to microprocessor 32, system memory 34, and peripheral device 36 via a local bus 38.

DMA controller 40 includes a memory address register 42, an incrementor/word count register 44, an address decoder 46, a mode register 48, and a timing and control circuit 50. Memory address register 42, incrementor/word count register 44 and mode register 48 are referred to collectively as "configuration registers". In the interest of clarity, only those portions of the DMA controller 40 as it relates to the present invention are shown and described herein, although it is understood that DMA controller 40 may incorporate a variety of additional circuit blocks.

As explained previously, before a DMA transfer can be executed, the DMA controller 40 must be initialized by providing certain initialization data from the microprocessor 32 to the configuration registers. This initialization data contains information regarding the direction of the transfer, the starting address of system memory 34, and the word count. The microprocessor 32 writes the initialization data into the configuration registers of DMA controller 40 by executing one or more I/O write cycles on local bus 38. More specifically, since the configuration registers of DMA controller 40 including memory address register 42, incrementor/word count register 44, and mode register 48 are mapped within the I/O addressable space of computer system 30, one or more of these registers can be written during an I/O write cycle with the initialization data. Address decoder 46 decodes the addressing signals of the I/O write cycles to determine the specific register being initialized. For example, memory address register 42, incrementor/word count register 44, and mode register 48 are each connected to a separate output line of address decoder 46. These output lines of address decoder 46 selectively provide latching signals to the respective configuration registers. Depending upon the address signal asserted on the local bus 38 during an I/O write cycle, these registers may be written with corresponding initialization data during the I/O write cycles. The address range of computer system 30 that is allocated for the addressing of the DMA configuration registers (to allow the loading of initialization data) is referred to herein as the "DMA configuration address range."

Following initialization, a DMA transfer may be commenced in response to a request signal asserted by peripheral device 36. As explained above, when the DMA controller 40 receives the request signal, it obtains mastership of the local bus 38 and generates the necessary read and write signals to effectuate the DMA transfer.

It is noted that the address of system memory 34 is stored within memory address register 42 and is incremented after each byte or word is transferred. The incrementor/word count register 44 stores a value indicative of the total number of bytes or words to be transferred, and mode register 48 stores mode information such as the direction of the data transfer. The timing and control circuit 50 generates the appropriate read and write signals depending upon the mode information stored within mode register 48. The DMA controller 40 of FIG. 3 depicts basic circuit blocks incorporated within both one-cycle and two-cycle DMA controllers.

Figure 4:
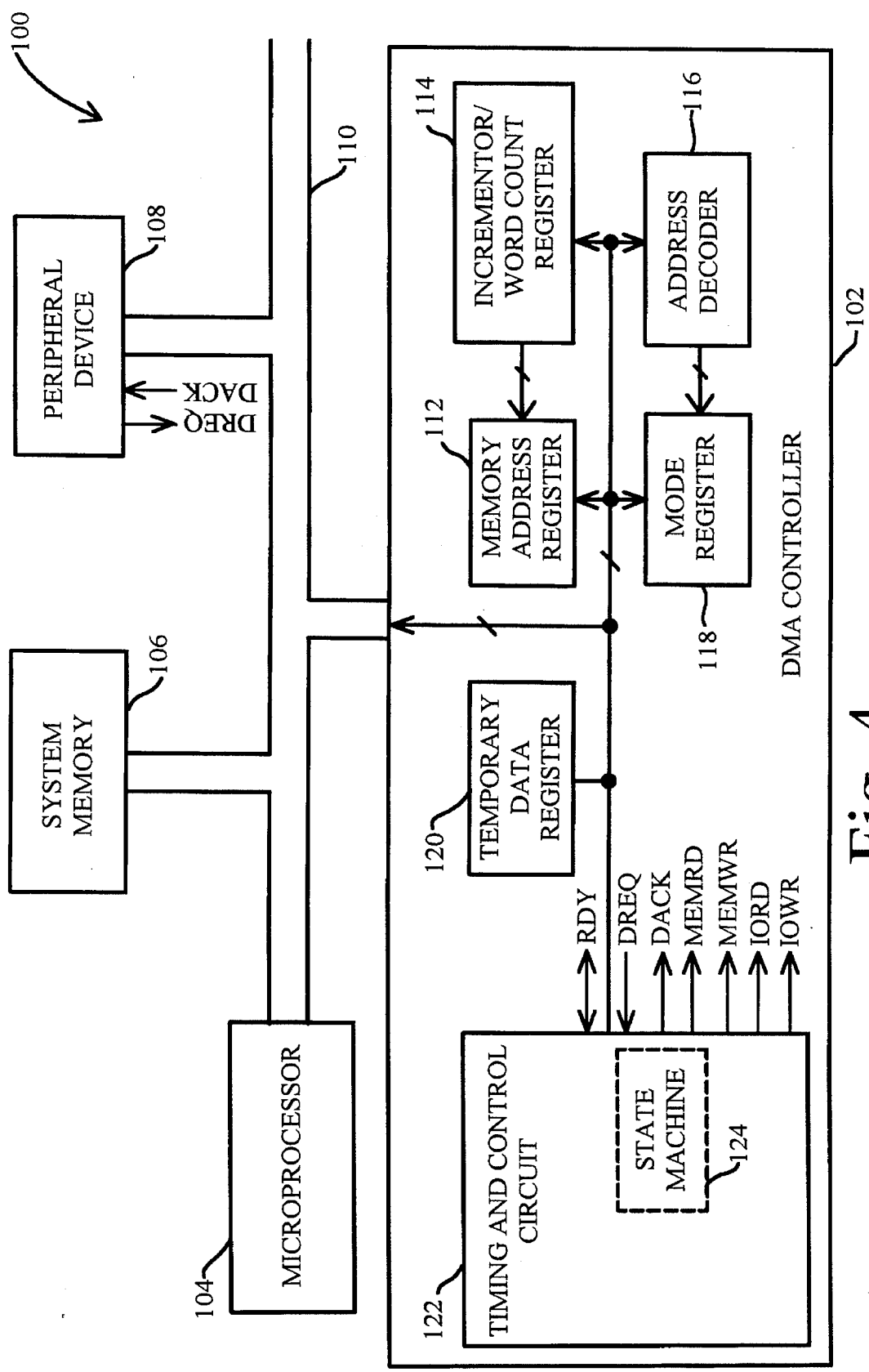
FIG. 4 is a block diagram of a computer system including a DMA controller in accordance with the present invention.

Turning now to FIG. 4, details of a computer system according to the present invention will next be considered. FIG. 4 is a block diagram of a computer system 100 that includes a DMA controller 102, a microprocessor 104, a system memory 106, and a peripheral device 108. A local bus 110 couples DMA controller 102 to microprocessor 104, system memory 106, and peripheral device 108.

DMA controller 102 includes a memory address register 112, an incrementor/word count register 114, an address decoder 116, and a mode register 118. The functions of these circuit blocks conform generally to the functions of the corresponding blocks of FIG. 3. DMA controller 102 further includes a temporary data register 120 and a timing and control circuit 122. A state machine 124 is shown in phantom within the timing and control circuit 122. The operation of state machine 124 as well as other details of DMA controller 102 will be explained further below.

During operation of computer system 100, microprocessor 104 must first initialize the DMA controller 102 before a desired DMA transfer can be executed. Initialization data is provided to the configuration registers (i.e., memory address register 112, incrementor/word count register 114, and mode register 118) in a manner similar to that described above with reference to FIG. 3. In this embodiment, microprocessor 104 may load the starting address of the desired DMA transfer into memory address register 112 by executing a first I/O write cycle to the address to which memory address register 112 is mapped. Microprocessor 104 may then load the word-count of the desired DMA transfer into incrementor/word count register 114 during a second I/O write cycle, and may load information indicative of the direction of the transfer into mode register 118 during a third I/O write cycle. Other initialization data may similarly be loaded into other configuration registers (not shown) during additional I/O write cycles. The address range of computer system 100 that is allocated for the addressing of the DMA configuration registers to allow the loading of initialization data is again referred to as the "DMA configuration address range."

Following initialization, a DMA transfer may be commenced in response to a request signal DREQ asserted by peripheral device 108. The request signal DREQ is asserted by peripheral device 108 when, for example, it is ready to transmit or receive a sequential block of data. The request signal DREQ is received by timing and control circuit 122 which accordingly obtains mastership of local bus 110 and asserts a DMA acknowledge signal DACK back to peripheral device 108. This portion of the operation is conventional.

DMA controller 102 implements a two-cycle DMA approach for performing the desired data transfers. When mastership of local bus 110 is attained and the DMA acknowledge signal DACK has been asserted back to peripheral device 108, state machine 124 generates the necessary control signals to access system memory 106 and peripheral device 108. For example, if the information stored within mode register 118 indicates that the desired operation is a data transfer from system memory 106 to peripheral device 108, state machine 124 first effectuates a memory read operation by asserting a MEMRD signal and driving the address lines of local bus 110 with the current memory address stored within memory address register 112. In this embodiment, the memory read signals asserted by DMA controller 102 are identical to those asserted by microprocessor 104 when it performs a memory read cycle. When the system memory 106 has read the corresponding data, it drives the data on the data lines of local bus 110 and asserts a ready signal RDY. Timing and control circuit 122 responsively causes the data to be latched into temporary data register 120. It is noted that for certain computer systems, separate read control and MEM/IO control signals could be asserted in the place of the MEMRD signal described above, and that such are equivalents. It is also noted that additional control signals may also be necessary to effectuate the memory read cycle. Such variations do not depart from the spirit and scope of the present invention.

During the next bus cycle of local bus 110, state machine 124 initiates an I/O write cycle by asserting an IOWR signal and enabling the output of temporary data register 120. During this cycle, state machine 124 drives the address lines of local bus 110 with an address value that is within the DMA configuration address range. As stated previously, the "DMA configuration address range" is the range of address values to which the configuration registers of DMA controller 102 are mapped for receiving initialization data. For example, if memory address register 112, incrementor/word count register 114, and mode register 118 are mapped to receive initialization data at address locations 0, 1 and 2, respectively, of the I/O address space, state machine 124 drives the address lines of local bus 110 with one of these address values (i.e., 0, 1, or 2) during the I/O write cycle of the DMA transfer. The reason for this will be better understood from the following.

When the IOWR signal is asserted by state machine 124 and the data within temporary data register 120 is driven on local bus 110, state machine 124 asserts the ready signal RDY and peripheral device 108 responsively latches the data within an internal data buffer. For a situation in which peripheral device 108 is, for example, a disk drive, after the data is latched within the internal data buffer, the data is stored at a predetermined sector on the disk in accordance with configuration information provided to the disk drive from microprocessor 104 prior to the commencement of the DMA transfer.

As stated previously, the address lines of local bus 110 are driven with an address value that is within the DMA configuration address range. This is done to prevent other I/O mapped peripherals (or other system resources) from responding to the I/O write cycle that is executed during the DMA operation and thus eliminates the necessity of an address disable signal. It is noted that when DMA controller 102 is the mastering device of local bus 110, the address decoder 116 of DMA controller 102 is disabled by the timing and control circuit 122, and accordingly address decoder 116 does not respond to the I/O write cycle either. As a result, while the desired write of data to peripheral device 108 is effectuated, addressing conflicts with other I/O mapped peripheral devices are prevented. Since an address disable signal is not required, the number of control lines on local bus 110 and the pin-count of the various integrated circuits forming, for example, DMA controller 102, system memory 106 and the various peripheral devices may be reduced.

The operation of DMA controller 102 is similar when a DMA transfer of data from peripheral device 108 to system memory 106 occurs. During a first bus cycle, state machine 124 asserts the IORD and DMA acknowledge signals. At the same time, state machine 124 drives the addressing lines of local bus 110 with an address value that is within the DMA configuration address range. Similar to the above, peripheral device 108 provides data on local bus 110 in response to the IORD and DMA acknowledge signals. When peripheral device 108 drives the corresponding data on the data lines of local bus 110, it simultaneously asserts the ready signal RDY which causes state machine 124 to latch the data into temporary data register 120.

During the next bus cycle, state machine 124 asserts the MEMWR signal and causes the address value within memory address register 112 to be driven on the address lines of local bus 110. State machine 124 simultaneously enables the output of temporary data register 121 and asserts the ready signal RDY. System memory 106 responsively stores the data residing in temporary data register 121 within an address location selected by to the address value. State machine 124 subsequently causes incrementor/word count register 114 to increment the address value within memory address register 112 and initiates similar cycles to perform additional data transfers until all the data as specified within incrementor/word count register 114 has been transferred.

It is noted that for the DMA transfer of data from peripheral device 108 to system memory 106 as explained above, an address disable signal is again not required since the address lines of local bus 110 are driven with an address value that is within the DMA configuration address range during the I/O read cycle. Accordingly, other peripheral devices that may be connected to local bus 110 and mapped within the I/O address space will not respond to the I/O read cycle. Similarly, since state machine 124 disables address decoder 116 when DMA controller 102 is the mastering device of local bus 110, address decoder 116 does not respond to the I/O read cycle either.

In accordance with the invention, the byte lane of local bus 110 to which peripheral device 108 provides data or from which peripheral device 108 receives data may be controlled by state machine 124. In one embodiment, the two lower order addressing bits $A_0$ and $A_1$ of local bus 110 are encoded to provide byte lane information to peripheral device 108. For example, in one embodiment peripheral device 108 is an 8-bit peripheral and local bus 110 includes 32 data lines $D_0$–$D_{31}$. A first byte lane is defined by data lines $D_0$–$D_7$, a second byte lane by data lines $D_8$–$D_{15}$, a third byte lane by data lines $D_{16}$–$D_{23}$, and a fourth byte lane by data lines $D_{24}$–$D_{31}$. State machine 124 controls the addressing bits $A_0$ and $A_1$ during the I/O cycle portion of a DMA transfer to indicate which of the four byte lanes peripheral device 108 will receive a byte of data on or which of the four byte lanes peripheral device 108 should provide a byte of data to. A similar approach can be taken for situations in which peripheral device 108 is a 16-bit peripheral. It is noted that although the state machine 124 encodes the low order addressing bits $A_0$ and $A_1$ to control the byte lane of local bus 110, the overall address value presented to the address lines of local bus 38 is still within the DMA configuration address range. It is also noted that the encoding of the lower order addressing bits to provide byte lane information to peripheral device 108 may be accomplished through either software or hardware control of state machine 124.

Figure 5:
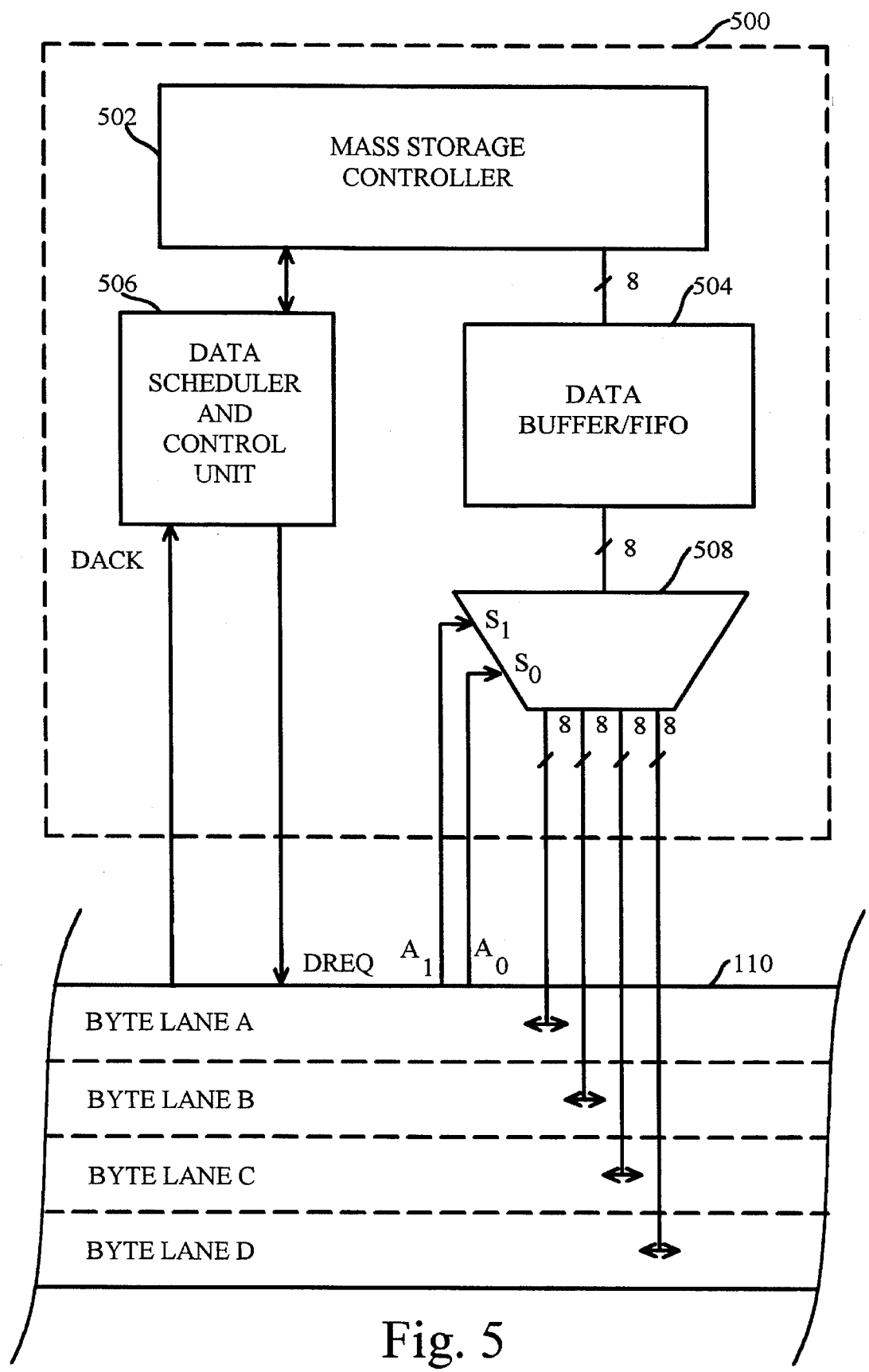
FIG. 5 is a block diagram of a peripheral device incorporated within the computer system.

FIG. 5 illustrates a block diagram of a peripheral device 500 coupled to local bus 110. In this embodiment local bus 110 is a 32-bit bus including four 8-bit byte lanes labeled "Byte Lane A", "Byte Lane B", "Byte Lane C", and "Byte Lane D". Peripheral device 500 is illustrative of, for example, a floppy disk drive, and includes a mass storage controller 502, a data buffer/FIFO 504, a data scheduler and control unit 506, and a bi-directional multiplexer 508.

As stated previously, during the I/O cycle portion of the DMA transfer, the two lower order addressing bits $A_0$ and $A_1$ of local bus 110 are encoded by state machine 124 (FIG. 4) to provide byte lane information to peripheral device 500. If the I/O cycle is a read cycle, an 8-bit byte is provided from data buffer/FIFO 504 to a specified byte lane of local bus 110 through multiplexer 508. Specifically, if the addressing bits $A_0$ and $A_1$ are both low, the byte is provided to Byte Lane A. Similarly, if addressing bit $A_0$ is high while addressing bit $A_1$ is low, the byte is provided to Byte Lane B. If addressing bit $A_0$ is low while addressing bit $A_1$ is high, the byte is provided to Byte Lane C. Finally, if the addressing bits $A_0$ and $A_1$ are both high, the byte is provided to Byte Lane D. A similar multiplexing scheme is used to transfer data in the opposite direction from local bus 110 to data buffer/FIFO 504 during an I/O write cycle.

The data scheduler and control unit 506 controls the storage of data (passed through data buffer/FIFO 504) within mass storage controller 502 and controls the retrieval of data from mass storage controller 502 according to programming instructions provided from the system microprocessor. Various circuit implementations for performing this function are well known to those of skill in the art.

Figure 6:
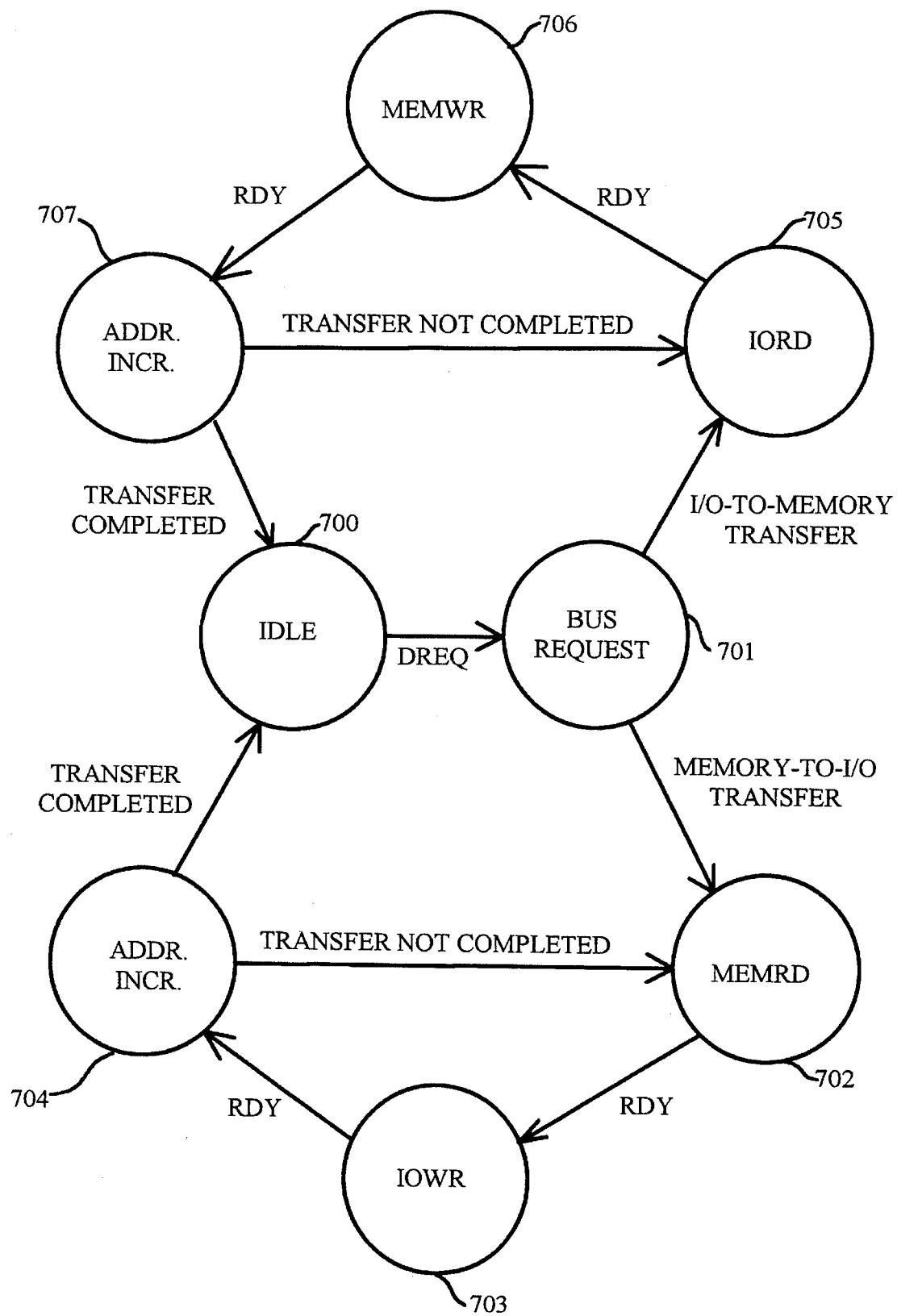
FIG. 6 is a state diagram that defines the operation of a state machine within a DMA controller.

The internal logic of state machine 124 is next considered. FIG. 6 is a state diagram that defines the operation of state machine 124. Referring collectively to FIGS. 5 and 6, upon reset of computer system 100, state machine 124 enters an idle state 700. When the DMA request signal DREQ is asserted by peripheral device 108, state machine 124 enters state 701. During state 701, state machine 124 requests and obtains mastership of local bus 110. Once mastership of local bus 110 has been attained, state machine 124 asserts the acknowledge signal DACK and makes a transition to either state 702 or 705 depending upon the mode instructions stored within mode register 118. If the mode instructions within mode register 118 indicate that the desired DMA operation is a transfer of data from system memory 106 to peripheral device 108, state machine 124 first executes a memory read cycle on local bus 110 during state 702. The addressing lines of local bus 110 are driven with the address value within memory address register 112 during this cycle.

During the next bus cycle, state machine 124 executes an I/O write cycle during state 703. The addressing lines of local bus 110 are driven with an address value within the DMA configuration address range during this cycle. Furthermore, if local bus 110 is a multi-byte bus, the byte lane of local bus 110 from which data is provided to peripheral device 108 is encoded by the lower two order address bits $A_1$ and $A_0$.

After completion of the I/O write cycle, the value within memory address register 112 is incremented by incrementor/word count register 114. If the desired number of words have not yet been transferred, state 702 is again entered and another memory read cycle is initiated. If the desired number of words have been transferred, state machine 124 enters idle state 700.

The operation is similar if the mode information within mode register 118 indicates that the desired DMA operation is a transfer of data from peripheral device 108 to system memory 106. In such a situation, after DMA controller 102 has attained mastership of the local bus 110 during state 701, state 705 is entered. During state 705, an I/O read cycle is executed by state machine 124. The address lines of local bus 110 are driven with an address value that is within the DMA configuration address range during this cycle. Furthermore, if local bus 110 is a multi-byte lane bus, the byte lane to which peripheral device 108 provides data may be controlled by appropriately driving the two low order address bits $A_1$ and $A_0$ of the addressing signal.

After the data has been read from peripheral device 108 during state 705, state machine 124 enters state 706 during which a memory write cycle is executed. The addressing lines of local bus 110 are driven with the address value stored within memory address register 112 during this cycle.

Following the memory write cycle, the address value stored within memory address register 112 is incremented if the desired word count has not yet been reached, and a subsequent I/O read cycle is executed during state 705. If the desired number of words have been transferred, state machine 124 reverts back to idle state 700.

The algorithmic state diagram of FIG. 6 may be reduced to a sequential logic circuit by employing a variety of well known circuit reduction techniques. For example, a sequential logic circuit that implements state machine 124 may be attained in accordance with the state reduction techniques taught within the publication *Digital Design* by M. Morris Mano, Prentice-Hall, Inc., pp. 220–236; and within the publication *Digital Computer Fundamentals—Sixth Edition* by Thomas Bartee, McGraw-Hill Book Company, pp. 170–175. These publications are incorporated herein by reference.

Computer-aided design tools may alternatively be employed to reduce the state machine 124 to a sequential logic circuit. Exemplary computer-aided design tools include the VHSIC hardware description language and the Verilog description language.

Figure 7:
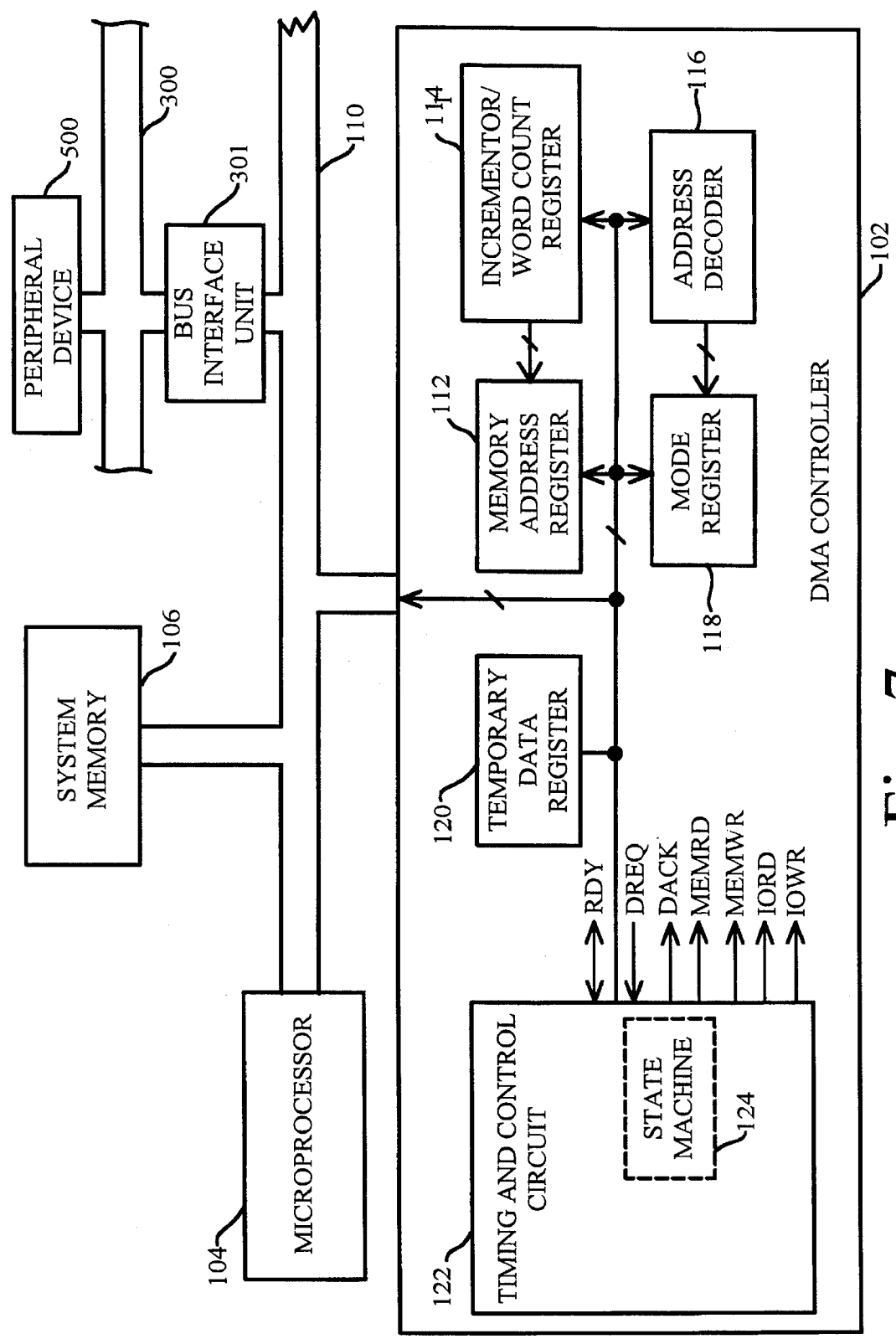
FIG. 7 is a block diagram of a computer system including a DMA controller.

It is noted that although peripheral devices 108 and 500 are shown within FIG. 4 and 5 coupled directly to local bus 110, peripheral devices 108 and 500 could be alternatively coupled to local bus 110 through a secondary peripheral bus and a bus interface unit. This implementation is illustrated in FIG. 7, in which a peripheral bus 300 and a bus interface unit 301 are coupled between peripheral device 500 and local bus 110. Peripheral bus 300 of such an embodiment could be implemented using a peripheral bus standard such as the PCI local bus standard configuration.

Further details regarding a DMA controller as illustrated in FIG. 4 may be found in the co-pending and commonly assigned application entitled "I/O Addressing Technique for a Direct Memory Access Controller and Computer System Incorporating the Same" by Gephardt et al, filed concurrently herewith. This application is incorporated herein by reference in its entirety.

Numerous variations and modifications will become apparent to those skilled in the art once the above disclosure is fully appreciated. It is intended that the following claims be interpreted to embrace all such variations and modifications.

What is claimed is:

1. A computer system comprising:

a local bus;

a microprocessor coupled to said local bus;

a system memory coupled to said local bus; and a direct memory access (DMA) controller coupled to said local bus and including:

a memory address register for storing a value indicative of a memory address; said memory address register having an address which falls in a DMA configuration address range and functions as one of a plurality of configuration registers; said configuration registers are configured to receive initialization data;

a mode register, as part of the said configuration registers, for storing information indicative of direction of a DMA operation; and a control circuit, coupled to said configuration registers, and for executing a memory access cycle during which said value representing said memory address is driven on said local bus and for executing, after the receipt of the initialization data, an I/O access cycle during which an address value within the said DMA configuration address range is driven on said local bus, wherein at least one low order addressing bit of said address value is encoded with byte lane information; and a peripheral device operatively coupled to said local bus and responsive to said I/O access cycle, wherein said peripheral device includes:

a data buffer; and a multiplexer capable of coupling data between a predetermined byte lane of said local bus and said data buffer according to said byte lane information.

2. The computer system as recited in claim 1 further comprising a word count register coupled to said control circuit for storing a value indicative of a number of words to be transferred during said DMA operation.

3. The computer system as recited in claim 2 further comprising a temporary data register coupled to said local bus.

4. The computer system as recited in claim 3 wherein said memory access cycle is a memory read cycle.

5. The computer system as recited claim 4 wherein said I/O access cycle is an I/O write cycle.

6. The computer system as recited in claim 5 wherein a byte of data is provided to said temporary data register from a system memory during said memory read cycle.

7. The computer system as recited in claim 6 wherein said byte of data is provided to a peripheral device during said I/O write cycle.

8. The computer system as recited in claim 1 further comprising an address decoder coupled to said mode register for storing mode information within said mode register when an I/O access cycle is executed on said local bus with an address value that is within said DMA configuration address range.

9. The computer system as recited in claim 8 wherein said address decoder is further coupled to said memory address register, and wherein a starting address value is stored within said memory address register when said address decoder is driven with an address value within said DMA configuration address range.

10. The computer system as recited in claim 3 wherein said memory access cycle is a memory write cycle.

11. The computer system as recited in claim 10 wherein said I/O access cycle is an I/O read cycle.

12. The computer system as recited in claim 11 wherein a byte of data is provided from a peripheral device to said temporary register during said I/O read cycle.

13. The computer system as recited in claim 12 wherein said byte of data is provided from said temporary register to said system memory during said memory write cycle.

14. A method for controlling a direct memory access (DMA) operation within a computer system including a system memory, a DMA controller having a plurality of configuration registers which fall in a DMA configuration address range, and a peripheral device coupled to a local bus, said method comprising the steps of:

receiving configuration information including information indicative of a memory address within said DMA controller;

storing said configuration information in said configuration registers of said DMA controller by addressing said DMA controller with address values within said DMA configuration address range;

executing a memory access cycle to access a predetermined memory location within said system memory during which said memory address is driven on said local bus; and executing an I/O access cycle, after storing said configuration information in said configuration registers, during which an address value within said DMA configuration address range is driven on said local bus, wherein at least one lower order addressing bit of said address value contains encoded byte lane information; and transferring a byte of data between a predetermined byte lane of said local bus and said peripheral device according to said encoded byte lane information.

15. The method for controlling a direct memory access operation as recited in claim 14 comprising the further step of storing said byte of data from said predetermined memory location in a temporary register of said DMA controller.

16. The method for controlling a direct memory access operation as recited in claim 15 comprising the further step of driving said byte of data stored within said temporary register on said predetermined byte lane of said local bus during said I/O access cycle.

\* \* \* \* \*